United States Patent [19]

Pierce

[11] 4,337,820
[45] Jul. 6, 1982

[54] LEAK DETECTOR FOR VAPORIZATION COOLED TRANSFORMERS

[75] Inventor: Linden W. Pierce, Rome, Ga.

[73] Assignee: General Electric Company, N.Y.

[21] Appl. No.: 123,621

[22] Filed: Feb. 22, 1980

Related U.S. Application Data

[62] Division of Ser. No. 21,543, Mar. 19, 1979, Pat. No. 4,232,551.

[51] Int. Cl.³ .................. F28D 15/00; G08B 21/00
[52] U.S. Cl. ................................ 165/11 R; 73/73; 340/646
[58] Field of Search ............. 165/11 R; 73/350, 40.7, 73/340, 342, 73; 336/57, 45; 174/14 R; 361/37; 222/51; 340/646

[56] References Cited

U.S. PATENT DOCUMENTS

| | | | |
|---|---|---|---|
| 1,232,834 | 7/1917 | Nichols | 174/14 R |
| 1,986,610 | 1/1935 | Stephens | 73/350 |
| 2,682,173 | 6/1954 | Camilli | 73/350 |
| 2,893,701 | 7/1959 | Bell | 165/11 |
| 3,144,314 | 8/1964 | Jackson | 174/14 R X |
| 3,939,698 | 2/1976 | De Lacy | 73/73 |
| 4,232,551 | 11/1980 | Pierce | 73/350 |

*Primary Examiner*—Daniel M. Yasich
*Attorney, Agent, or Firm*—Robert A. Cahill

[57] ABSTRACT

A vaporization cooled transformer of the type comprising a transformer tank in combination with a heat exchanger employs temperature sensing means in both the tank and the heat exchanger for sensing a predetermined temperature differential to indicate the presence of air in the transformer. When the temperature differential exceeds a predetermined range, an alarm and a transformer disconnect relay become actuated. The temperature differential sensor can also be calibrated to provide excess moisture indication above a threshold moisture content caused by the saturation of the molecular sieve water scavenger within the transformer assembly.

1 Claim, 22 Drawing Figures

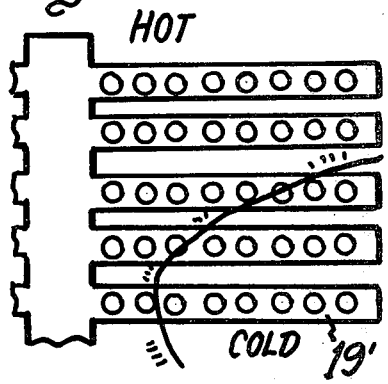
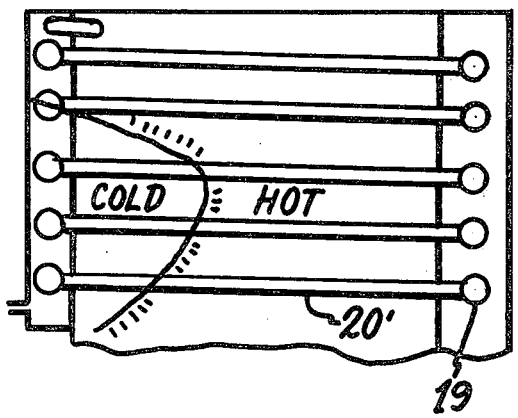
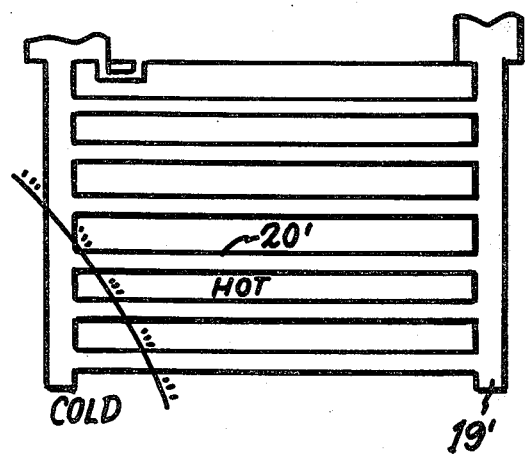

ent air temperature;
LEAK DETECTOR FOR VAPORIZATION COOLED TRANSFORMERS

This is a division of application Ser. No. 021,543, filed Mar. 19, 1979, now U.S. Pat. No. 4,232,551.

BACKGROUND OF THE INVENTION

U.S. patent application Ser. No. 843,676 filed Oct. 19, 1977, now abandoned discloses a vaporization cooled transformer wherein a vaporizable fluid is used for providing both cooling facility and dielectric capability to transformer cores and windings. An effective liquid level gage for sensing the quantity of coolant is described in U.S. patent application Ser. No. 939,123 filed Sept. 5, 1978, now abandoned. The liquid level gage adequately provides shutoff facility when a vaporizable fluid such as trichlorotrifluoroethane leaks out of the transformer tank. The aforementioned vaporization cooled transformer utilizes a quantity of molecular sieve material in the vapor path between the transformer tank and the heat exchanger as a water scavenger to remove any moisture that may be released from the cellulosic insulation materials during transformer operation. Since the insulating material continuously release water vapor to the transformer interior over the operating life of the transformer, a sufficient quantity of the molecular sieve material is employed to provide for adequate water adsorption throughout the operating life of the transformer. In the event that the sieve material becomes saturated, excess moisture can occur within the transformer and behave as an ideal gas under certain temperature conditions. The excess moisture under these conditions can cause corrosion of the heat exchanger.

When leaks develop through openings occurring within the heat exchanger or tank assembly a negative internal pressure within the heat exchanger or tank assembly allows a substantial quantity of ambient air to enter through the leak openings. The presence of a quantity of atmospheric air within the heat exchanger can be detrimental to the transformer operation. One long-term deleterious effect is the premature saturation of the molecular sieve material due to the presence of substantial quantities of water vapor present within the admitted air.

Short-term deleterious effects which can occur due to the presence of the admitted air include both an overpressure condition caused by reduced heat exchanger efficiency as well as coolant loss by the escape of the vaporizable coolant out through the leak openings. The heat exchanger efficiency is decreased because the presence of the trapped air within the heat exchanger headers and cooling tubes prevents the vaporized coolant from entering into these areas during the condensation periods of the vaporization-condensation cycle. The loss in cooling efficiency in turn causes the transformer to operate at a higher temperature causing further increases in pressure until an overpressure mechanism becomes energized and the transformer becomes automatically disconnected.

The purpose of this invention is to provide means for sensing the differences in temperature that exist between the heat exchanger and the transformer tank to determine the presence of admitted air within the heat exchanger assembly as well as the presence of excess moisture.

SUMMARY OF THE INVENTION

Temperature sensing means are installed both in the heat exchanger and the transformer tank in vaporization coold transformers. The temperature differential between the heat exchanger and the tank is sensed to determine when a predetermined temperature differential is exceeded. The excess temperature differential indicates the presence of ambient air to excess moisture within the transformer. Alarm indicating means and transformer disconnect relays are actuated when the temperature differential exceeds the predetermined range.

BRIEF DESCRIPTION OF THE DRAWINGS

FIGS. 11A–11C are diagrammatic representations of the temperature separation which occurs within the side, front and bottom sections of a portion of a heat exchanger at 100% transformer loading;

DESCRIPTION OF THE PREFERRED EMBODIMENTS

Figure 1:
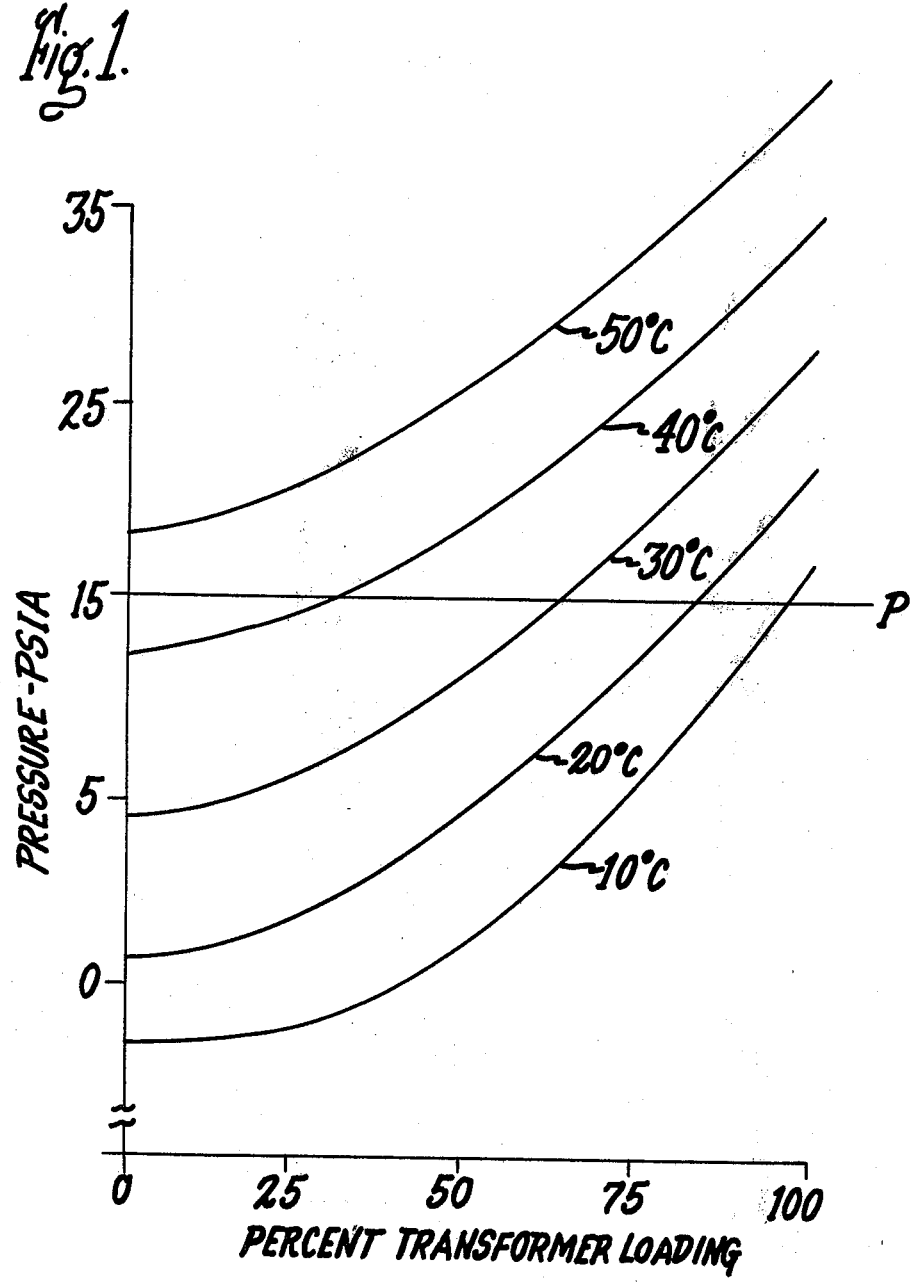
FIG. 1 is a graphic representation of the coolant vapor pressure of a vaporization cooled transformer as a function of transformer loading for contours of ambient air temperature.

FIG. 1 shows the relationship between vaporized coolant pressure and transformer loading existing within a vaporization cooled transformer for various ambient temperatures. It can be seen that the coolant vapor pressure within the transformer at low conditions of loading and low ambient temperatures can be quite low. A standard atmospheric pressure line P is included at 15 pounds per square inch absolute (PSIA) for comparison purposes. Pressures beneath the standard atmospheric pressure line P are considered as negative pressures for the purposes of this disclosure.

Figure 2:
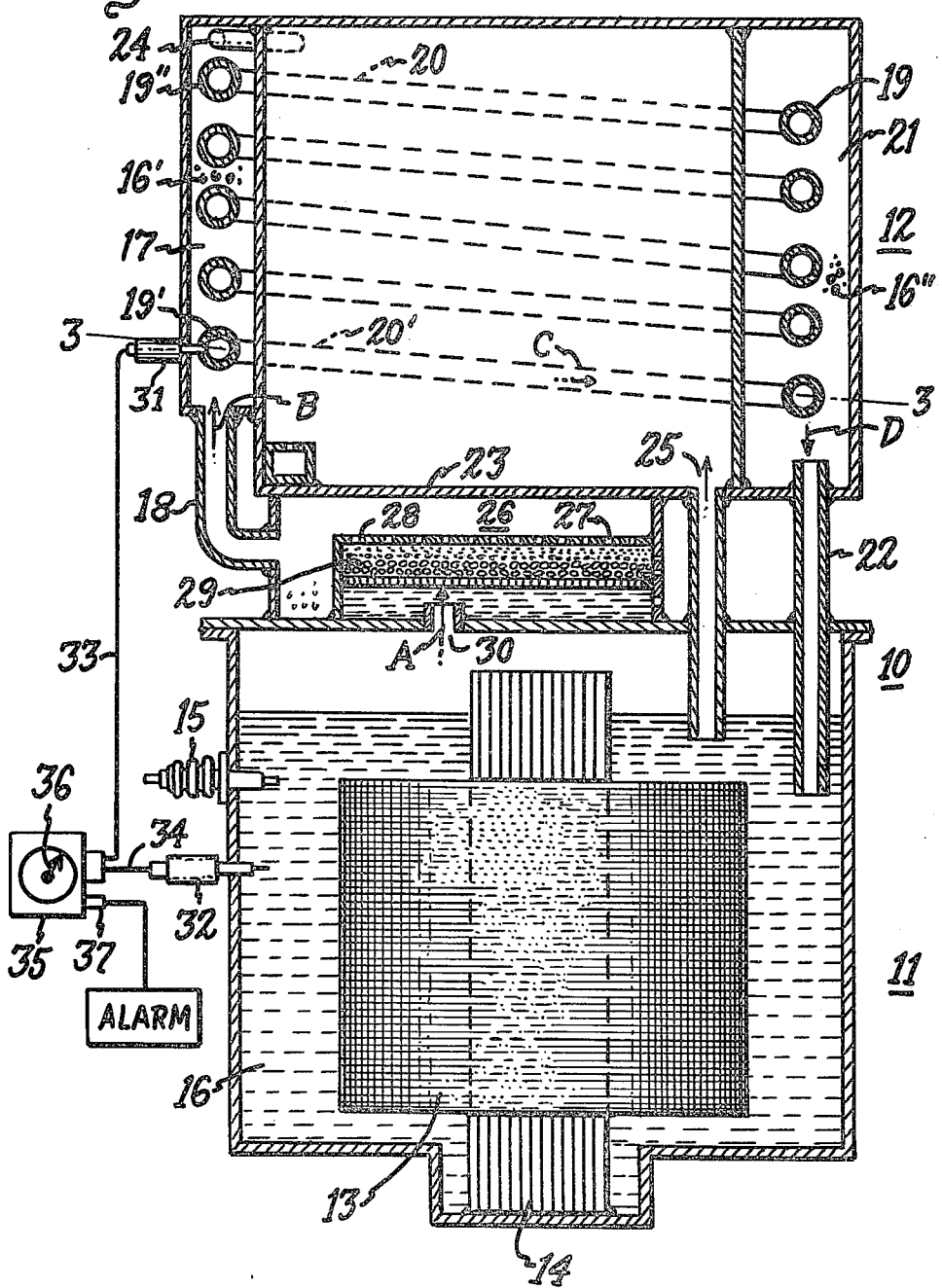
FIG. 2 is a front section view of a vaporization cooled transformer containing the leak detection means according to the invention.

FIG. 2 contains a vaporization cooled transformer 10 as described within the aforementioned U.S. Patent applications which are incorporated herein by way of reference. The vaporization cooled transformer 10 comprises a transformer tank 11 and a heat exchanger 12 wherein the transformer windings 13, core 14, and bushing 15 are cooled by means of vaporizable coolant 16. The coolant becomes vaporized by the heat generated by the transformer core and the windings and the vaporized coolant 16' enters up into the intake manifold 17 within the heat exchanger by means of intake pipe 18 in the direction indicated by arrow B. A plurality of headers 19 are connected to the intake manifold and in turn are connected with a plurality of inclined cooling tubes 20 connecting between the intake manifold 17 and return manifold 21. The condensed coolant droplets 16" return to the transformer tank from the return manifold by means of return pipe 22. An expansion tank 23 is provided for the expansion of the vaporized coolant and is connected with the intake manifold by means of connector pipe 24. Any coolant vaporizing within the expansion tank returns to the transformer tank by means of expansion return pipe 25. Located between the transformer tank 11 and intake pipe 18 is a molecular sieve container 26 consisting of a quantity of moisture adsorbing molecular sieve material 27 within housing 28 which contains a plurality of apertures 29 for retaining the molecular sieve material while permitting the transport of the coolant. Upon becoming vaporized, coolant 16' transmits out from the transformer tank through opening 30 in the direction indicated by arrow A.

As previously discussed, the presence of a leak in any portion of the heat exchanger 12 or tank 11 causes an influx of ambient air into the heat exchanger assembly. During transformer operation the admitted air stabilizes within heat exchanger headers 19 after a period of extended use and settles in lowest header 19' within the intake manifold. The presence of a quantity of admitted air within any of the headers 19 prevents vaporized coolant 16' from entering those headers and their associated cooling tubes 20 so that the headers and cooling tubes remain at a somewhat lower temperature than the remaining cooling tubes and headers. This is because the vaporized coolant is prevented from condensing and transmitting its heat of vaporization within the "air locked" headers and cooling tubes. The air locked condition also occurs when fans are employed to increase the cooling efficiency of the heat exchanger. The insertion of a temperature sensor 31 such as a thermocouple, within the lowest header 19' and a sensor 32 within the transformer tank provides one means for sensing the temperature of the lowest header 19' and of the coolant within the transformer tank at any given time. Connecting the thermocouples 31, 32 by means of electrical connectors 33, 34 to a differential temperature gage 35 allows the temperature difference between the header and the transformer tank to be rapidly determined. Once the temperature differential is determined a direct readout is provided by indicator 36 in order for an operator to monitor the temperature differential while the transformer is operating. A terminal 37 is provided on the differential temperature gage in order to provide an output signal for connecting to an audio-visual alarm device and to a circuit breaker relay for interrupting input power to the transformer when a predetermined temperature differential is exceeded.

Figure 3:
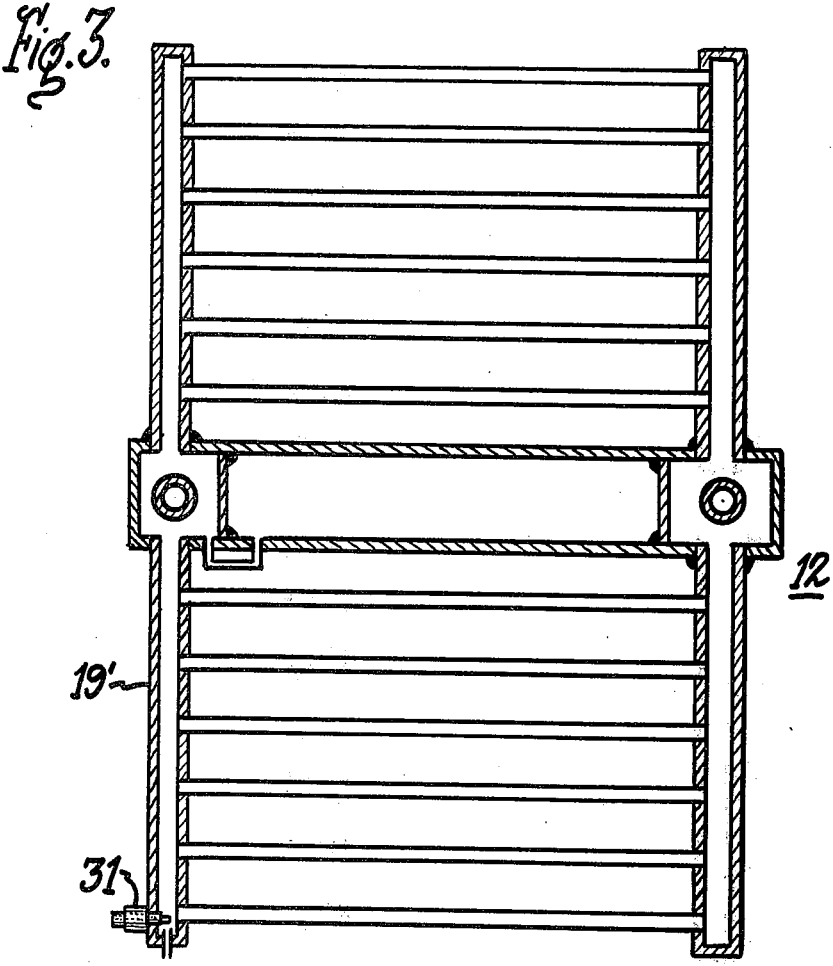
FIG. 3 is a top section view of the heat exchanger of FIG. 2 through the plane 3—3.
Figure 4:
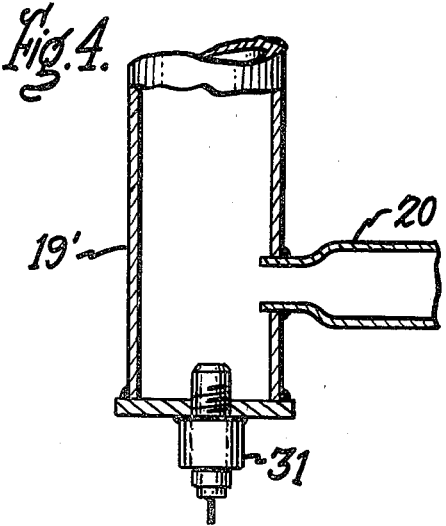
FIG. 4 is an enlarged section view of the lower header within the embodiment of FIG. 1 with the temperature sensor connected to the end of the header.

The temperature sensor 31 can be connected to heat exchanger 12, which is horizontally arranged, by connection through the side of the lowest header 19' as indicated in FIG. 3 or by connection through the end of the lowest header 19' as shown in FIG. 4.

Figure 5:
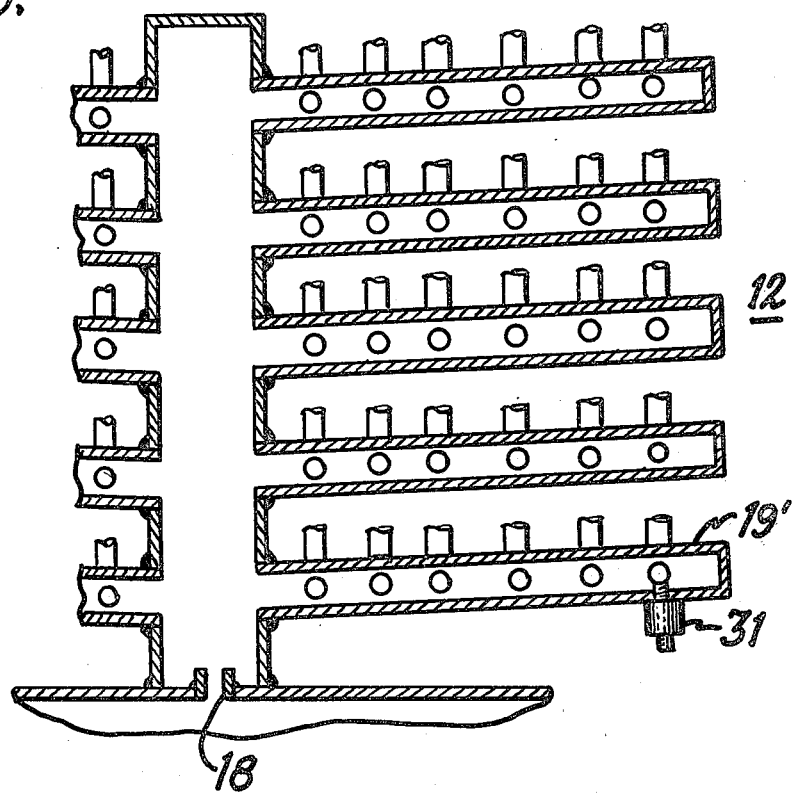
FIG. 5 is a side section view of a vertically arranged heat exchanger as an alternative to the horizontally arranged heat exchanger of FIG. 2.

The temperature sensor 31 can be located at the bottom of heat exchanger 12 of FIG. 5 by connecting through the side of lowest header 19' which is higher than entrance pipe 18 as indicated.

Figure 6:
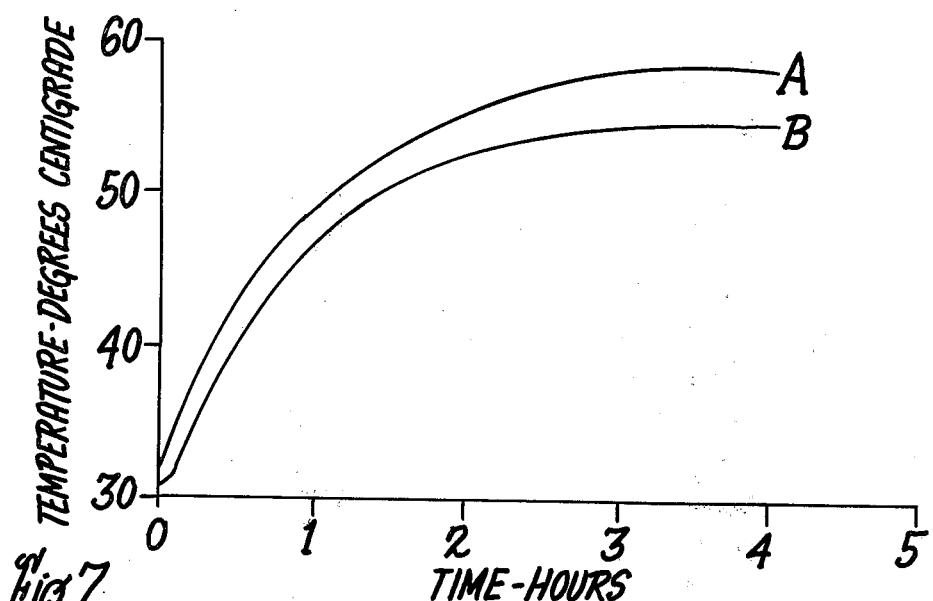
FIG. 6 is a graphic representation of the relation between temperature and time for the embodiment of FIG. 2 in the absence of a leak.

For normal operating conditions and in the absence of any leaks the temperature of the interior surface of the header or tube being monitored is approximately the same temperature as the temperature of the vaporized coolant 16' within the associated header or tube. A series of tests were performed on a 1000 Kva transformer within a 31° C. ambient. FIG. 6 shows the temperatures from time of startup at a relatively high load value of 15,380 watts. As shown, the temperatures of the coolant in the tank A and the coolant vapor in the lowest header B, are approximately equal. The temperature of the lowest header is about 3° C. less due to thermocouple errors and conduction heat loss through the header. It had previously been concluded that upon transformer startup, coolant in the tank would heat up in the vicinity of sensor 32 (FIG. 2) before hot coolant vapor could move through the heat exchanger to sensor 31. However, the coolant vapor rapidly reaches sensor 32 so that sensor 32 stays approximately at the same temperature as sensor 31 during the startup cycle. This is indicated by the near equal temperature conditions for both A and B.

Figure 7:
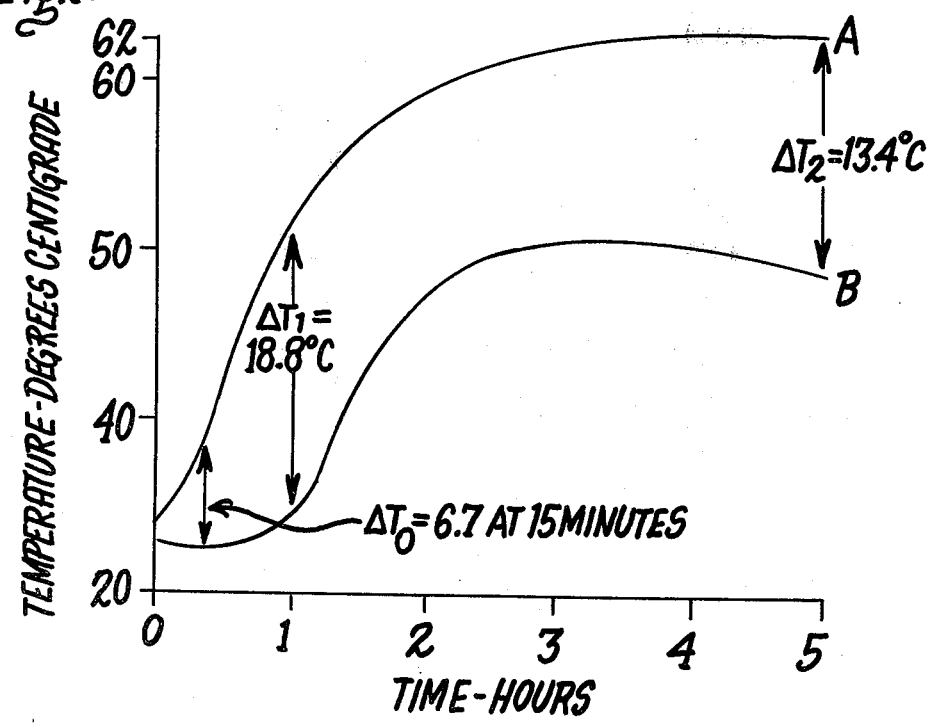
FIG. 7 is a graphic representation of the relation between temperature and time for the embodiment of FIG. 2 in the presence of a leak.

A quantity of air admitted to the transformer resulted in the temperatures A and B shown in FIG. 7. When the air was admitted into the transformer, the load had to be reduced to 9770 watts in order not to damage the windings. For this load value the steady state pressure measured 8.6 psig. For the temperature values shown in FIG. 6 the pressure measured 5.3 psig at the higher load value. As the transformer containing the admitted air is further loaded, the temperature of sensor 32 begins to rise. However, due to the air leak, the temperature of sensor 31 remains constant for the first 30 minutes. The temperature difference $\Delta T_0$ is 6.7° C. after 15 minutes. The temperature difference $\Delta T_1$ is 18.8° C. after one hour. The leak detector can therefore give an early indication of the presence of a leak before a dangerous over pressure develops. The temperature of sensor 31 begins to heat up after one hour, possibly due to the hot vapor in the heat exchanger intermixing with the admitted air. However, the lowest header remains at a lower temperature due to the air leak. At steady state conditions the temperature difference $\Delta T_2$ was still approximately 13.4° C.

Figure 8:
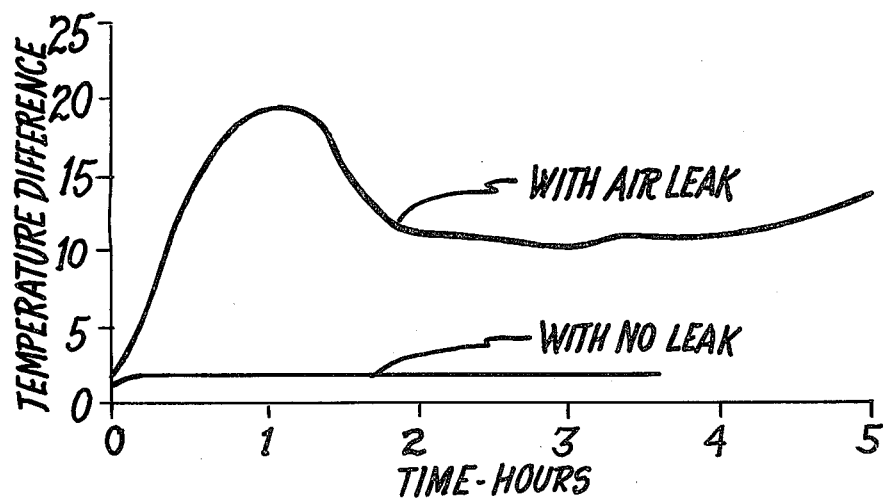
FIG. 8 is a graphic representation of the temperature differential between the temperature depicted in FIGS. 6 and 7 as a function of time.

FIG. 8 is a graphic representation of the temperature differential occurring between sensors 31 and 32 with and without a leak. An alarm can be connected to terminal 37 on the temperature gage 35 in FIG. 2 and preset above approximately 6° C. to allow for sensor errors and load deviation. Temperature differentials above preset values of from 0° to 10° C. would operate the alarm to give an audible and visual indication of the presence of a leak.

The leak detector which comprises the combination of temperature gage 35 and sensors 31 and 32 can have a direct reading visual scale, an audible alarm, or a visual and audible signaling mechanism, depending on transformer location and operator preference. The leak detector can also be electrically coupled with a transformer disconnector relay.

Figure 9A:
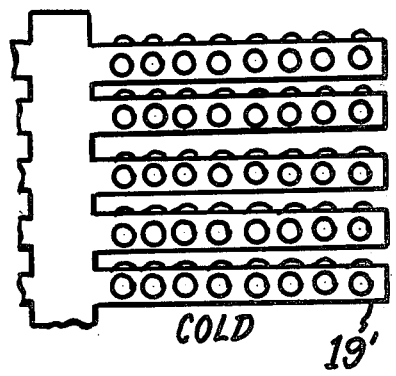
FIGS. 9A–9C are diagrammatic representations of the temperature separation which occurs within the side, front and bottom section views of a portion of a heat exchanger at 25% transformer loading.
Figure 9B:
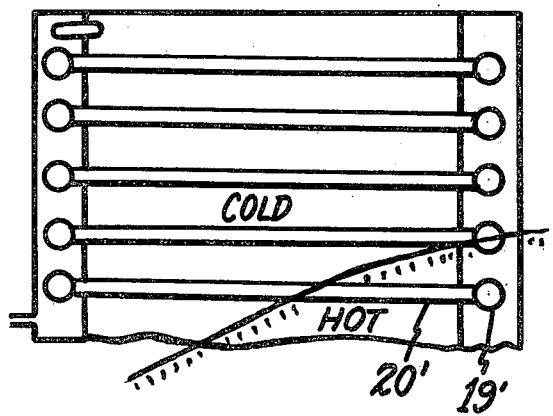
Figure 9C:
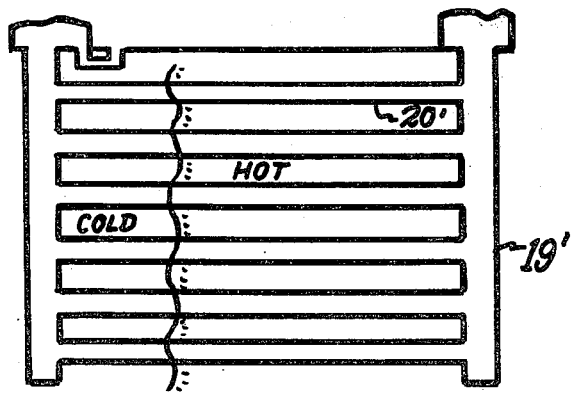
Figure 10A:
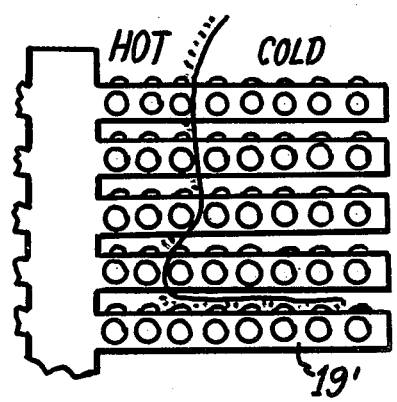
FIGS. 10A–10C are diagrammatic representations of the temperature separation which occurs within the side, front and bottom section views of a portion of a heat exchanger at 75% transformer loading.
Figure 10B:
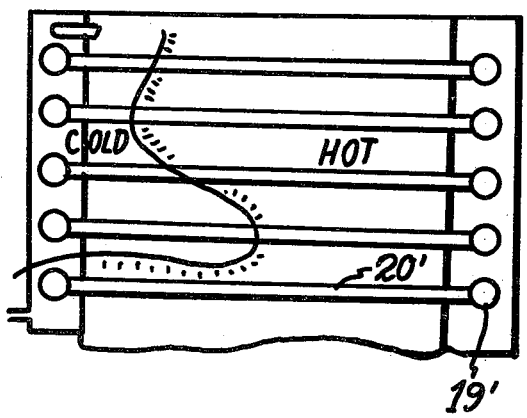
Figure 10C:
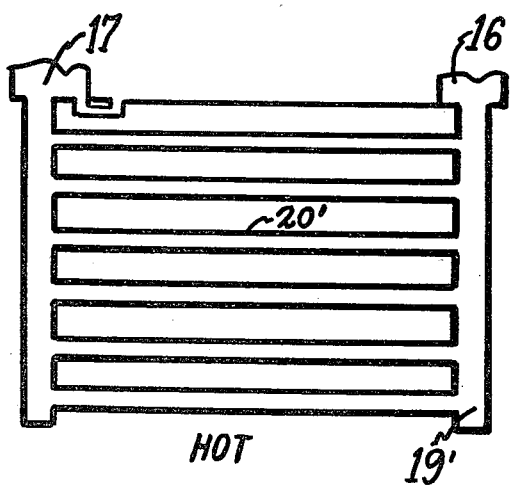

FIGS. 9 through 11 depict the location of the hot vapor and cooler air in a 750 Kva transformer for loads of 3600, 9000, and 12,000 watts. The 12,000 watts value represents the approximate full load rating and the 9000 watt and 3600 watt values represent 75% and 25% load values respectively. As shown in FIGS. 9A-9C for 25% loading and FIGS. 10A-10C for 75% loading, the lowest row of cooling tubes 20' are partially cold at 25% loading and entirely hot at the higher 75% rating. When the loading is increased to 100% the lowest row of cooling tubes has a well defined cool region as shown in FIGS. 11A-11C.

When loads are less than 100%, the increase in coolant vapor pressure, which occurs in the presence of a leak, is not as detrimental as full load conditions and can be withstood until the load conditions increase further to 100%.

Figure 12:
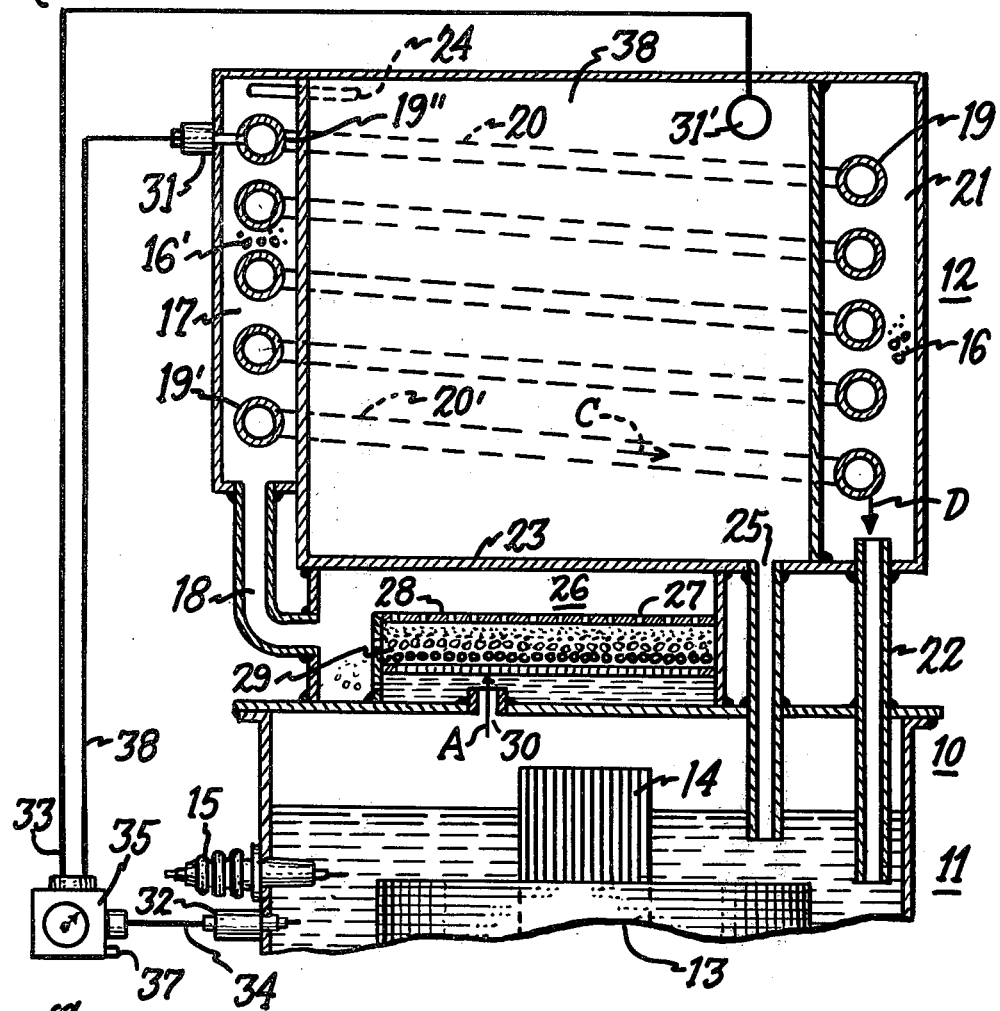
FIG. 12 is a front section view of a vaporization cooled transformer containing a further arrangement of the leak detection means of the invention.

As shown in FIG. 12, sensor 31 may be located in the highest header 19". An additional sensor 31' can be located within expansion tank 23 and connected to gage 35 by conductor 38 for use in combination with sensor 31 so that an indication can be received from either sensor 31 or sensor 31' relative to sensor 32.

Under leak conditions at full load, temperature increases were sensed at sensor 32 while the temperatures at 31 and 31' decreased to lower levels. Temperature differentials in excess of the 6° C. setting are sufficient to cause standard overpressure gages to become energized at high loads and to cause the transformers to be automatically shut down by standard auxiliary relay equipment. This occurs since pressures generated in excess of the standard overpressure gage setting of 15 psig can cause damage to the heat exchanger assembly. It is to be noted that pressure increases within the heat exchanger assembly and the transformer tank during operation cause a corresponding increase in the boiling temperature of the coolant so that the transformer operates at a higher temperature.

Figure 13:
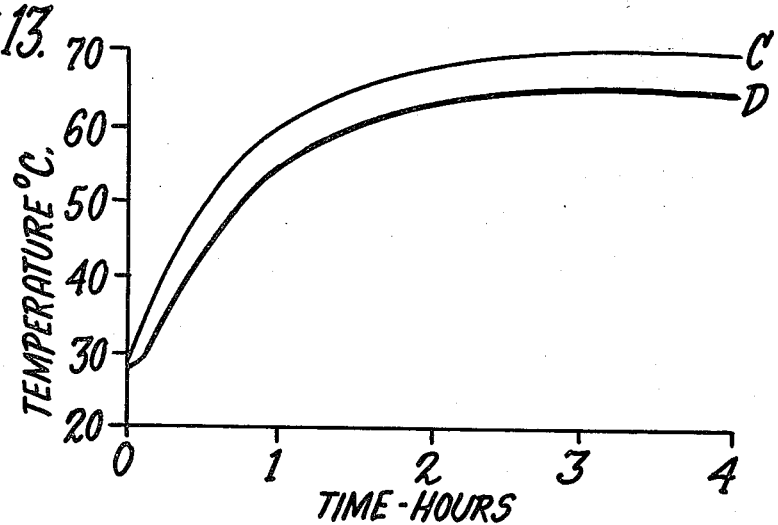
FIG. 13 is a graphic representation of the relation between temperature and time for the embodiment of FIG. 12 in the absence of a leak.
Figure 14:
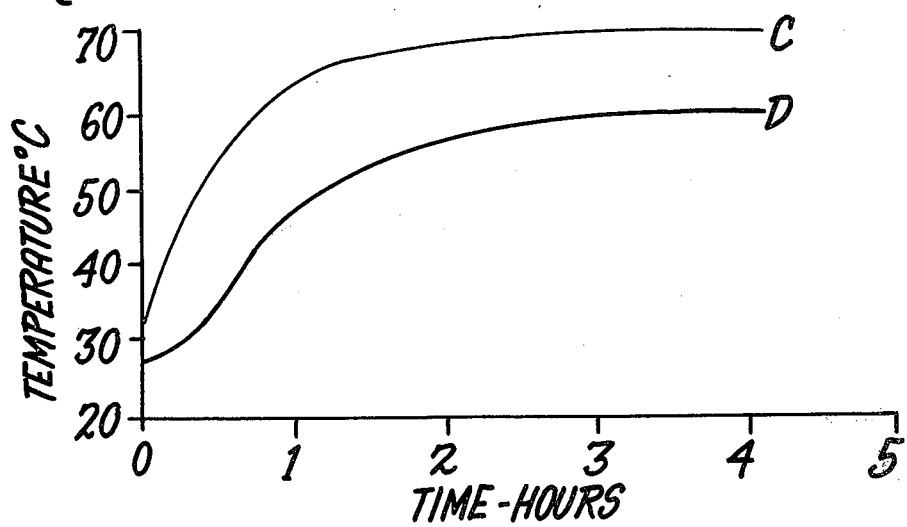
FIG. 14 is a graphic representation of the relation between temperature and time for the embodiment of FIG. 12 in the presence of a leak.
Figure 15:
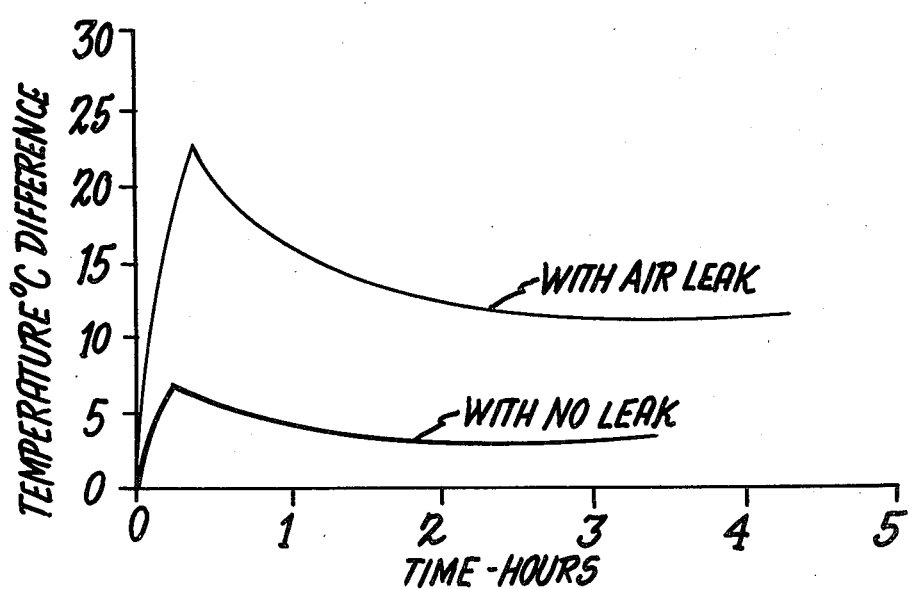
FIG. 15 is a graphic representation of the temperature differential between the temperatures depicted in FIGS. 13 and 14 as a function of time.

The temperatures monitored at sensor 32 within the transformer tank and sensor 31' within the expansion tank, are shown at C and D respectively in FIG. 13 for transformer operation in the absence of a leak. The same temperatures monitored, when air was admitted are shown in FIG. 14. It is to be noted that a differential occurs similar to that described earlier for the header mounted sensor 31 of FIG. 2. This differential is shown in FIG. 15 under both regular and leak conditions over a period of time.

Intentionally forming leaks of various sizes at different locations within the horizontal heat exchanger assemblies of FIGS. 2 and 12 confirmed the fact that the admitted air generally settles in the lowest header on the intake manifold side of the heat exchanger assembly. The reason for the settling of the admitted air in the lowest header within the intake manifold is not at this time well understood. It is noted however, that regardless of where the leak occurs most of the admitted air does in fact locate within the lowest header within the intake manifold. There is also a temperature differential occurring within the lowest cooling tubes 20' associated with the lowest header 19' relative to the temperature of the coolant within the transformer tank.

Figure 16:
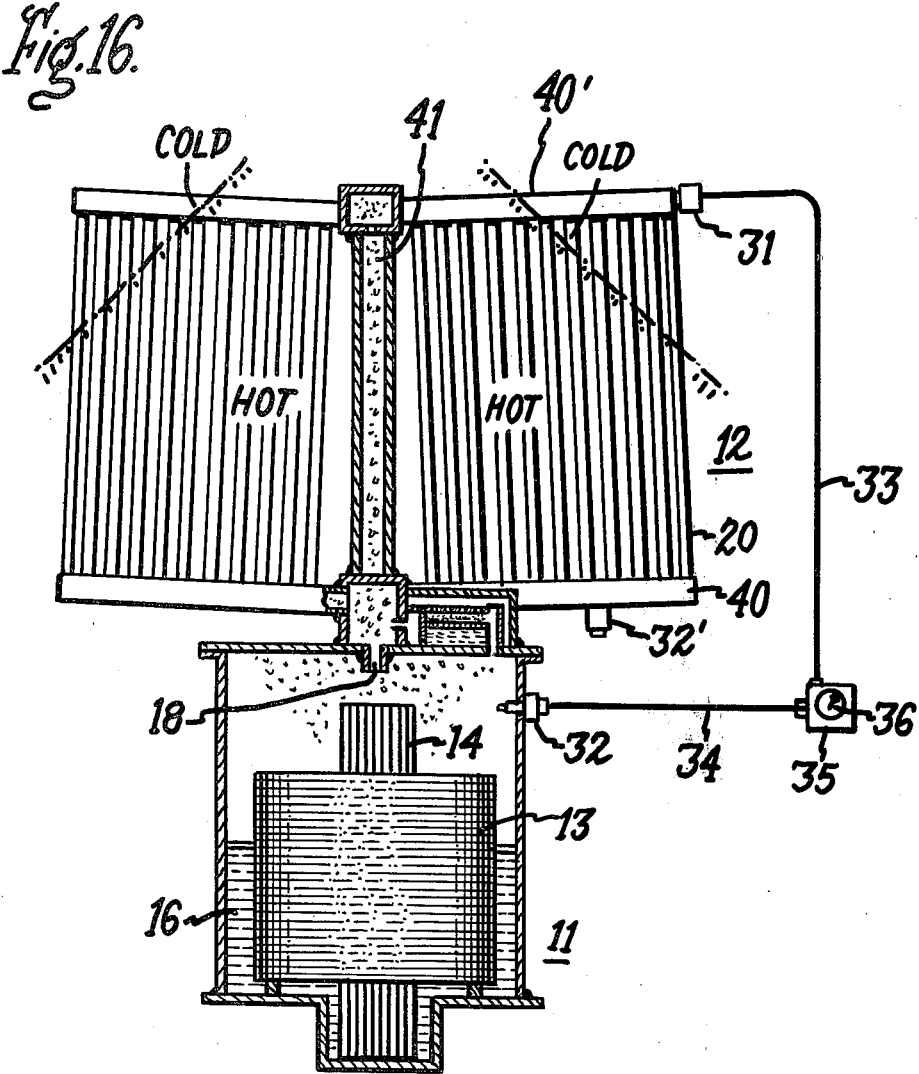
FIG. 16 is a diagrammatic representation of the temperature separation which occurs within a vaporization cooled transformer depicted in a partial section front view having vertical cooling tubes and containing the leak detection means according to the invention.

The leak detector of this invention can be used with other heat exchanger designs. FIG. 16 depicts a vertical type heat exchanger 12 described in aforementioned U.S. patent application Ser. No. 843,676 filed Oct. 19, 1977. Air leaking into this heat exchanger 12 consisting of vertical tubes 20, segregates in upper header 40' as well as within the upper region of expansion chamber 41 and cooling tubes 20. Sensor 31 may optionally be located within upper header 40' or within expansion tank 41.

Since the remainder of the cooling tubes and headers are hot relative to the top end portions of the tubes and headers it is to be clearly understood that sensor 32 can be connected to the hot portions of the headers and cooling tubes as well as to the transformer tank. An auxiliary sensor 32' connected to the hot portion of one of the headers 40 can provide a temperature differential relative to sensor 31 in the colder region of the heat exchanger.

Sensor 32 may be mounted within coolant 16 in tank 11, in the hot vapor space above the coolant as shown in FIGS. 2 and 12, or within the main vapor supply pipe 18 to the heat exchanger. Sensor 32 can also be located within the hot portion of one of the headers 40 or cooling tubes 20 in the heat exchanger for providing a temperature differential relative to sensor 31.

The leak detector of the invention also provides effective high moisture indication. When the molecular sieve material 27 in FIG. 2 becomes inoperative due to excessive moisture within the transformer, the excess water vapor behaves as a noncondensable gas and segregates in a manner similar to the admitted air in the presence of a leak and provides the same hot and cold regions indicated earlier in FIGS. 9-11.

Although thermocouples are used as the temperature sensors within the transformer tank and the heat exchanger assembly, other temperature sensing means such as thermistors, resistive elements and direct reading thermometers can also be employed.

It is to be understood that the pressure within both the heat exchanger and the transformer tank can increase for a variety of reasons. This invention is directed to means for determining the presence of a leak either within the heat exchanger assembly or the transformer tank above the coolant liquid level that is not readily detectable until the transformer becomes energized. The presence of admitted air within the transformer tank, for example, can cause serious dielectric problems immediately upon transformer startup. The admitted air is not determinable with standard type pressure sensing means either within the tank or heat exchanger assembly. A sufficient quantity of admitted air will immediately indicate a temperature differential between sensor 31 located within the heat exchanger and sensor 32 within the transformer tank before any dielectric breakdown problems can occur within the transformer windings during startup conditions.

Although the leak detector of the invention is directed to vaporization cooled transformers, this is by way of example only. The invention finds application wherever heat exchangers and vaporization cooled electrically heated elements may be employed.

What I claim as new and desire to secure by Letters Patent of the United States is:

1. An excess moisture detector for vaporization cooled transformers comprising:
   a transformer tank containing a condensable coolant and having an opening in the top;
   a heat exchanger assembly connected to the top of said transformer tank for receiving said coolant in vapor form and returning said coolant in condensed form to the tank;
   a quantity of moisture adsorbing material in an apertured container located intermediate the heat exchanger and the tank for removing moisture from the coolant, said moisture adsorbing material being moisture saturated due to excessive moisture within said transformer;
   temperature sensing means within a portion of the heat exchanger to determine the temperature within said heat exchanger;
   temperature sensing means within the tank to determine the temperature of the coolant within the tank; and
   indicating means for determining the differences in the heat exchanger temperature and the coolant temperature and for providing an indication when a predetermined temperature differential is exceeded thereby detecting that said moisture adsorbing material has become inoperative due to the presence of excess moisture.

* * * * *